Sept. 20, 1966  G. G. HENRY  3,273,311
ANIMAL HALTER
Filed Aug. 12, 1964
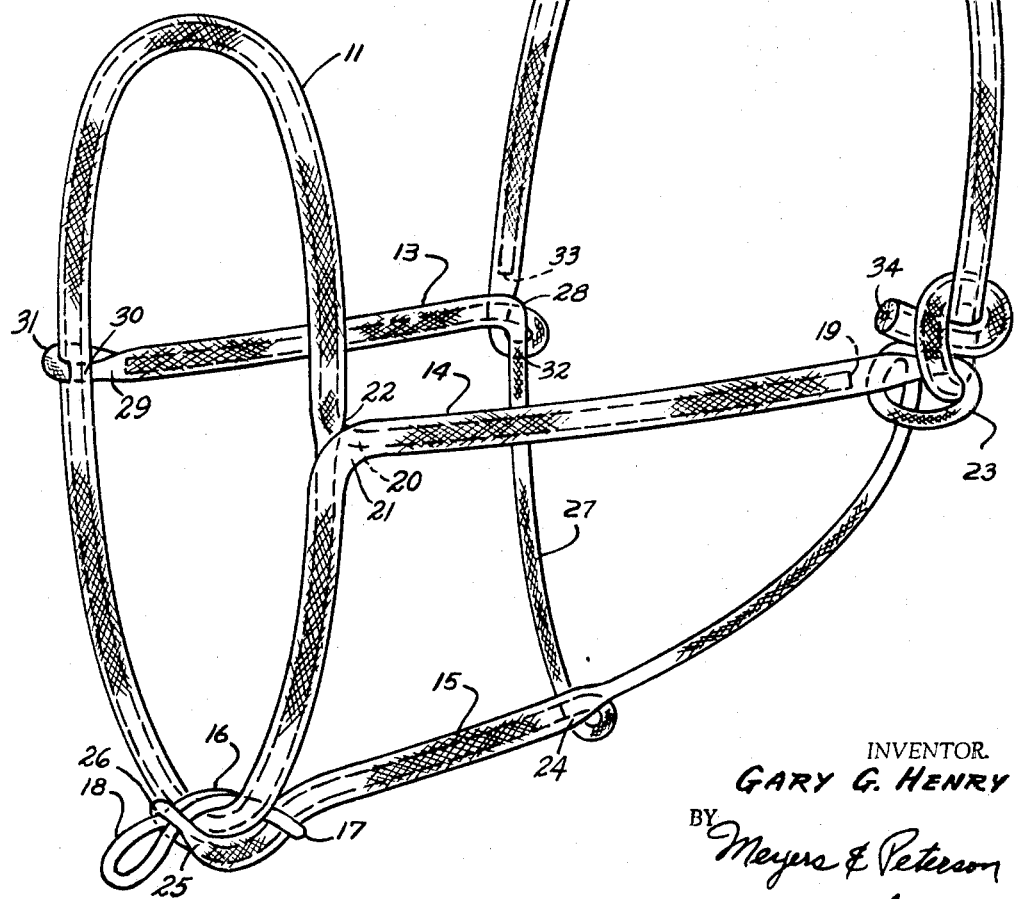
INVENTOR.
GARY G. HENRY
BY Meyers & Peterson
ATTORNEYS United States Patent Office 3,273,311
Patented Sept. 20, 1966

3,273,311
ANIMAL HALTER
Gary G. Henry, 2119 S. Cleveland, Sioux City, Iowa
Filed Aug. 12, 1964, Ser. No. 389,059
3 Claims. (Cl. 54—24)

The present invention is concerned generally with an improved animal halter, and more specifically to an improved halter of this type which is fabricated from a single length of braided hollow-core line.

In the preparation of animal halters, it is normally necessary for the manufacturer to stock several sizes and weights of halters. In this connection, the production technique normally requires that the several sizes and weights of halters be simultaneously produced. Any departure from this production routine would place an undue requirement or burden on inventory. In addition, the various sizes and weights of conventional halters may require various types of hardware, each being distinct from the other. Therefore, the inventory of these components places an additional economic burden on the producer. Turning to the other features, the juncture point between the hardware and the line normally forms the weakest area or point in the halter assembly. In other words, since the hardware is normally metallic and the line of a non-metallic substance, these components are not of matching durability, and hence the line normally fails due to a concentration of stresses or abrasion in these juncture areas. Since the advent of hollow-core braided synthetic line of high strength, it is now possible to fabricate an animal halter which comprises a single length of line, interwoven through itself to such an extent that no external hardware is needed.

Briefly, according to the present invention, the animal halter comprises a single length of line, preferably hollow core synthetic line which can be woven through itself so that hardware is not required at the splice areas. The animal halter prepared in this manner is pleasing in appearance, exceptionally strong in areas where previously weak, and utilizes matched materials for equalization of wear and stress distribution.

The use of line prepared from synthetic fibers is particularly adapted to animal halters. In this connection, they are both rot-resistant and waterproof. Furthermore, the material is dimensionally stable, has a minimum stretch and is accordingly preferred over conventional manila line or the like.

Therefore, it is an object of the present invention to provide a single piece animal halter which is prepared from a single length of braided hollow-core line.

It is a further object of the present invention to provide an improved animal halter prepared from a single length of hollow-core braided synthetic fibers which does not require external hardware.

It is still a further object of the present invention to provide an improved animal halter which is fabricated from a single length of hollow-core braided line prepared from synthetic fibers, various portions of the line being enclosed within other portions of the line in order to provide a unitary structure.

Other and further objects of the present invention will become apparent to those skilled in the art upon a study of the following specification, appended claims, and accompanying drawing wherein:

FIGURE 1 is a side view of the head and neck portion of a horse fitted with a halter prepared in accordance with the present invention;

FIGURE 2 is an enlarged perspective view of a halter prepared in accordance with the present invention, and illustrating the winding technique utilized to form the halter without requiring external hardware for securing various portion together; and FIGURE 3 is a detailed fragmentary view of a short length of line showing one portion enclosed within a second portion.

In accordance with the preferred modification of the present invention, the animal halter generally designated 10 as shown in FIGURE 2 comprises a nose loop portion 11, a head loop portion 12, a pair of side pieces or segments 13 and 14, and a yoke member 15. In order to conveniently lead or tether the animal, a figure "8" link 16 is provided, this link having a pair of eyes or openings at opposite ends thereof together with a central closed shank area therebetween. The rear open portion shown at 17 is adapted to accommodate a loop portion at the front of the yoke, and the front opening area as shown at 18 is normally used to accommodate a snap or the like.

In preparing a single piece animal halter, the operator initially cuts a length of line from a roll, the length being adequate to prepare the size of halter desired. For a normal size horse, for example, a 17 foot length is ordinarily required. With particular attention directed to FIGURE 2 of the drawing, it will be seen that the initial operation is to measure back from a starting end 19 of the line a length which is substantially equal to the desired length of the later side piece 14, to a point 20, this length being about 10 inches in the case of a halter for a medium size horse. From a point 20, a length is measured which is twice the length adequate to form the nose piece, to the point 21. For a medium size horse, this length will be about 56 inches. The rope is then spread open at the point 21 and the end 19 is inserted into the rope and forced around until it reaches the point 22 in order to form the coaxial nose piece 11, after which the rope is spread open and the end 19 is withdrawn and then inserted back into the main line at the point 21 where the nose loop 11 begins. The main rope is then effectively brought around in order to form a small loop and lock as at 23, and the yoke 15 is formed. In this connection, an 8 inch section is measured from the loop 23 to a point 24, and a point 25 9½ inches beyond the 8 inch point 24 is then marked. The long piece is then tucked into itself at the point 25 and passed back and brought out at the point 24 in order to provide for the lock 26 which is at the front of the yoke 15. At this point, another 8 inch segment is measured in order to form the second side 27 of the yoke, terminating at point 28. Thereafter, a 10 inch length is measured from the point 28 to a point 29, after which the line is passed through the nose piece 11 at about point 30. The line is then tucked into itself and passed to the point 28 and withdrawn, thus forming a loop 31 and the coaxial side piece 13. The rope is then passed through itself at a point 32 in order to form a lock, the leftover piece then being about 52 inches long. The final step is to fold the line back into itself to form the upper coaxial portion of the head piece 12, the end of the rope then being at 33, and the fold defining a free end 34. The free end 34 is then tied in the area formed by the loop 23, and the halter is complete. It will be appreciated that other animal halters may be prepared using a similar technique, and in particular other size horse halters may be prepared by using a somewhat similar technique.

For an ordinary mature horse, a braided polyethylene rope having a core diameter of between about ⅜ inch and 9/16 inch has been found suitable. This line has a test strength of about 2,000 pounds or more. Lines of this type are commercially available.

It will, of course, be understood that various changes may be made in the form, details, arrangements and proportions of the parts without departing from the scope of the invention as set forth in the appended claims.

I claim:

1. Halter means for livestock comprising a yoke, a nose loop portion, a head loop portion and a pair of side pieces connecting said nose loop portion to said head loop portion, said halter means being formed from a unitary and continuous length of hollow braided line having opposite respective terminal ends and adapted to receive and enclose another section of said line within itself, said nose loop portion being formed from a section of said line lying between a first point near one of the terminals ends of said line and a second point spaced from said first point by a distance equal to twice the length adequate to form said nose loop portion, said one terminal end of said line being inserted within said line at said second point and forced around within said line so that said nose loop portion is formed of a coaxial layer of said line, one of said side pieces being defined by a section of said line lying between said second point and a third point on said line, a loop and lock being formed in said line at said third point, said yoke being formed from a section of said line lying between said third point and a fourth point on said line, said yoke having a loop intermediately thereof, said loop being formed by insertion of the opposite free end of said line into the interior of said line near the midpoint of said yoke section forcing said opposite end back through said line a predetermined distance and withdrawing it from the interior of said line, said line being withdrawn until a relatively small loop remains at said midpoint, the other of said side pieces being formed from a section of said line lying between said fourth point and a fifth point on said line spaced from said fourth point by substantially twice the length of said other side piece, said other side piece being provided with a loop engaging said nose loop portion by threading the opposite free end of said line through said nose portion at a desired point thereon and thereafter threading said opposite free end of said line back into said line, passing it back to said fourth point and there withdrawing it and drawing said line through said other side piece until said loop is formed, the balance of said line forming said head loop portion and being secured to said loop at said third point to form the completed halter means.

2. A halter means as defined in claim 1 wherein the segment of said line lying between said one terminal end and said first point is substantially the length of said one side piece, said terminal segments being inserted within said line and lying coaxally within said one side piece.

3. Halter means as defined in claim 1 wherein the segment of said line forming said head loop portion is substantially twice the length required to form said head loop portion, said line being folded back within itself whereby said head loop portion is formed of a coaxial double layer of said line.

References Cited by the Examiner
UNITED STATES PATENTS

| | | | |
|---|---|---|---|
| 357,643 | 2/1887 | Thummel et al. | 54—24 |
| 485,278 | 11/1892 | Hutton | 54—24 |
| 506,475 | 10/1893 | Covert | 54—24 |
| 643,123 | 2/1900 | Green et al. | 54—24 |
| 1,172,328 | 2/1916 | Wardwell | 87—9 |
| 2,614,451 | 10/1952 | Lippey | 87—9 |
| 3,102,715 | 9/1963 | Weitzel et al. | 87—9 X |
| 3,130,630 | 4/1964 | Dawes | 87—2 |

SAMUEL KOREN, *Primary Examiner.*

ALDRICH F. MEDBERY, *Examiner.*